(12) United States Patent
Furusawa

(10) Patent No.: US 7,431,652 B2
(45) Date of Patent: Oct. 7, 2008

(54) UNIVERSAL JOINT

(75) Inventor: Toshio Furusawa, Kawasaki (JP)

(73) Assignee: Mitsuya Laboratories, Inc., Kanagawa (JP)

( * ) Notice: Subject to any disclaimer, the term of this patent is extended or adjusted under 35 U.S.C. 154(b) by 300 days.

(21) Appl. No.: 11/274,399

(22) Filed: Nov. 15, 2005

(65) Prior Publication Data

US 2007/0042826 A1    Feb. 22, 2007

(30) Foreign Application Priority Data

Aug. 18, 2005    (JP) .............................. 2005-237338

(51) Int. Cl.
*F16D 3/00*    (2006.01)
(52) U.S. Cl. ..................... 464/120; 464/115
(58) Field of Classification Search ................. 464/113, 464/115, 120, 122, 125; 403/57
See application file for complete search history.

(56) References Cited

U.S. PATENT DOCUMENTS

| 2,595,936 | A | * | 5/1952 | Goode, Jr. .................... 464/115 |
| 3,091,102 | A | * | 5/1963 | Linderme .................... 464/120 |
| 3,406,534 | A | * | 10/1968 | Chapper ...................... 464/115 |
| 4,114,401 | A | * | 9/1978 | Van Hoose ................... 464/120 |

* cited by examiner

*Primary Examiner*—Aaron M Dunwoody
(74) *Attorney, Agent, or Firm*—WolfBlock LLP (57) ABSTRACT

A universal joint is provided with a rotation shaft having a ball portion provided at an end thereof and a pair of projections formed on a diameter line of the ball portion, and a rotation body having guide grooves formed for receiving insertion of the respective projections of the rotation shaft and a holding hole formed for holding the ball portion, the ball portion being rotatable about an axis line of the projections and rotatable while inclining the projections along the guide grooves. In the universal joint pins serving as a stopper are provided in the holding hole for inhibiting the ball portion from slipping off.

2 Claims, 8 Drawing Sheets

*Prior Art*

Fig. 5

*Prior Art*

Fig. 6

*Prior Art*

*Prior Art*

UNIVERSAL JOINT

BACKGROUND OF THE INVENTION

1. Field of the Invention

This invention relates to a universal joint having a rotation body and a rotation shaft which cause bending in any direction.

2. Description of the Related Art

FIG. 4 to FIG. 8 show an example conventionally known as the above type of universal joints. The conventional universal joint in FIGS. 4 to 8 has ball portions 2 and 3 respectively provided at the ends of a rotation shaft 1. The ball portions 2 and 3 have the respective pairs of projections 4 and 5 formed on the diameter lines of the ball portions 2 and 3.

Figure 4:
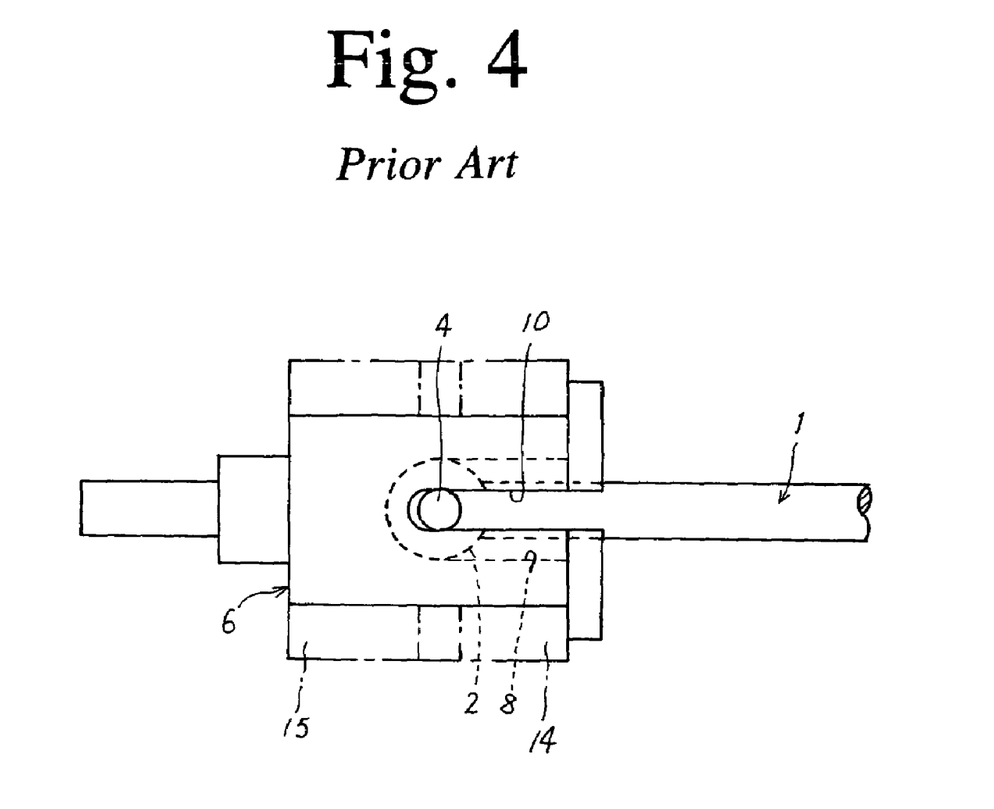
FIG. 4 is a front view illustrating a conventional universal joint.
Figure 5:
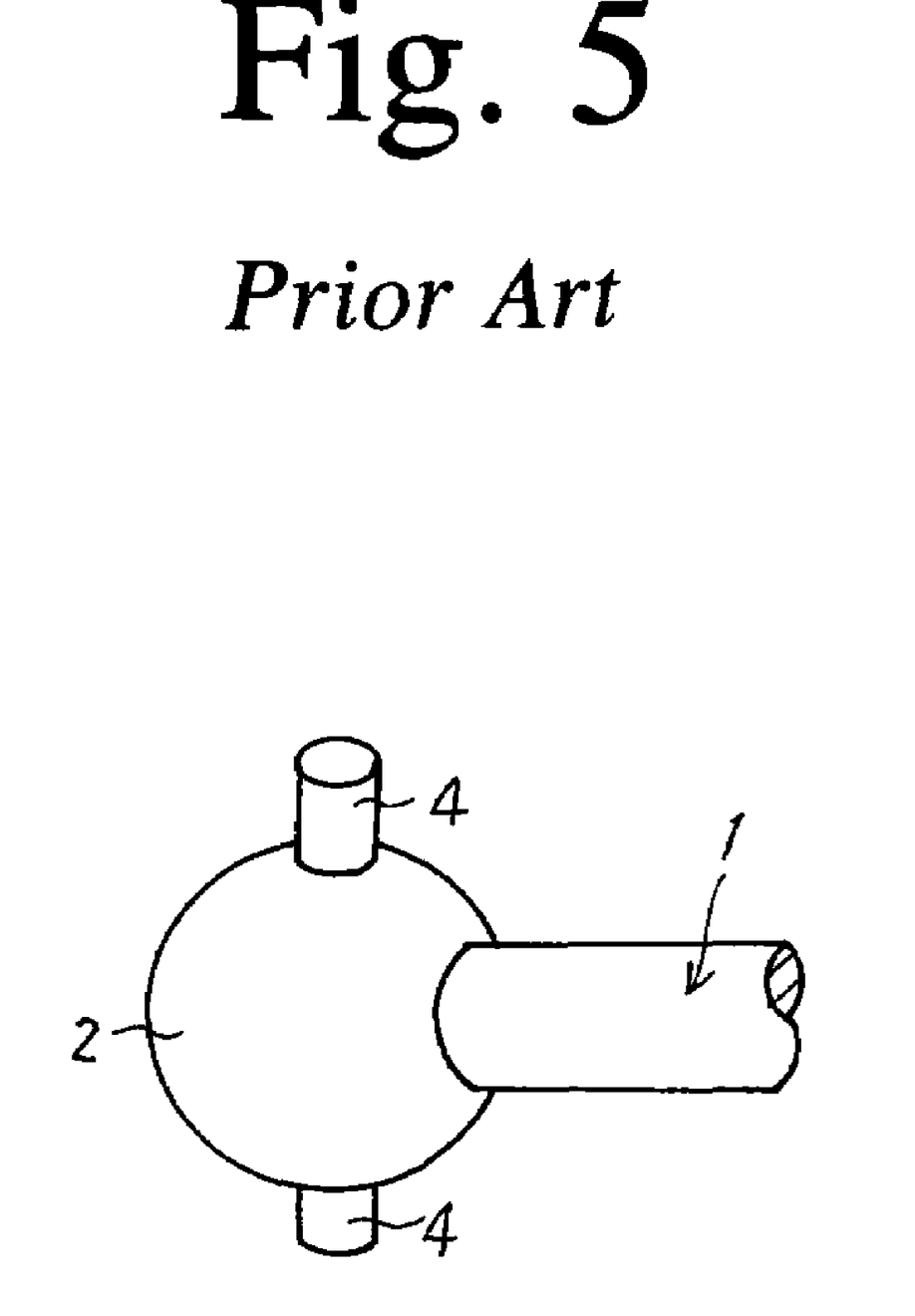
FIG. 5 is a perspective view of a conventional ball portion formed on a rotation shaft.

Two rotation bodies 6 and 7, which are coupled to the rotation shaft 1, are formed in a tubular shape and respectively have holding holes 8 and 9 formed on their axis. The holding holes 8 and 9 respectively receive the ball portions 2 and 3 and allow them to slide in the axis direction. The rotation body 6 has guide grooves 10 formed in positions 180 degrees out of phase with each other, and the rotation body 7 has guide grooves 11 formed in a like manner. The guide grooves 10 slidably receive the respective projections 4 of the ball portion 2 which is placed in the holding hole 8, and likewise the guide grooves 11 slidably receive the respective projections 5.

By placing the ball portions 2 and 3 in the respective holding holes 8 and 9 in this manner, the ball portions 2 and 3 can rotate about the axis line of the projections 4 and 5, and further rotate while tilting the projections 4 and 5 in the guide grooves 10 and 11. Thus the rotation shaft 1 is capable of rotating in any direction with respect to the rotation bodies 6 and 7.

Figure 6:
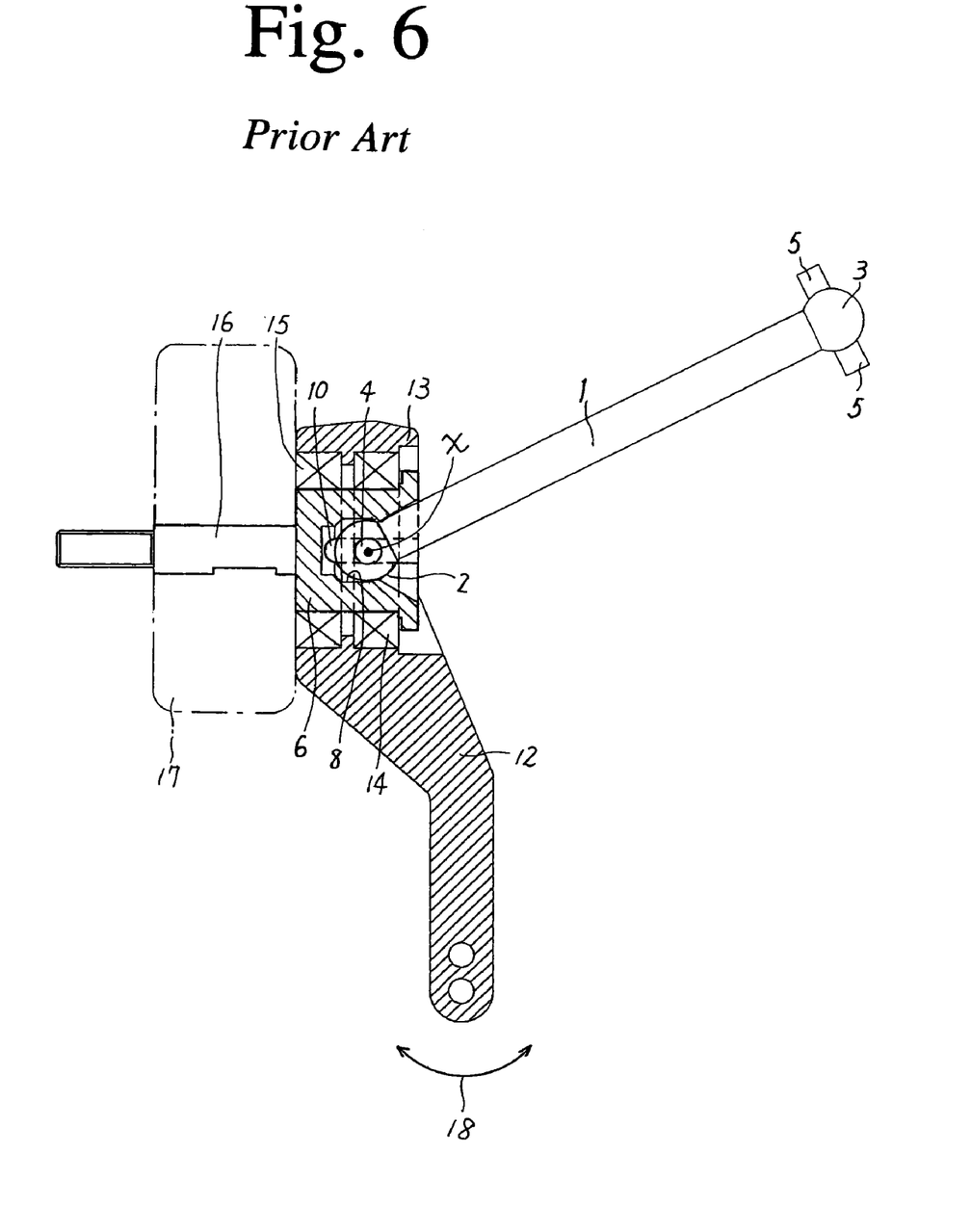
FIG. 6 is a partially sectional view of a conventional universal joint associated with a drive wheel provided in a steering mechanism of a radio-controlled car.

For example, a universal joint structured as described above is used to couple a drive wheel of a radio-controlled car or the like to an output shaft or the like. When a drive wheel of a radio-controlled car is coupled to an output shaft, the rotation body 6 is coupled to the drive wheel as shown in FIG. 6. Specifically, the rotation body 6 is mounted, via bearings 14 and 15, in a ring portion 13 formed in a steering knuckle arm 12 for the drive wheel. The drive wheel 17 is fixed to an axle 16 provided integrally with the rotation body 6. Accordingly, upon the rotation of the rotation shaft 1, the rotation body 6 rotates and the drive wheel 17 rotates with the rotation of the rotation body 6. The knuckle arm 12 moves rotationally in directions of the arrows 18 shown in FIG. 6, and the center of the rotational motion is a point X corresponding to the center of a kingpin (not shown).

The other rotation body 7, which is located opposite to the rotation body 6, is coupled to an output shaft (not shown) and rotates in conjunction with the output shaft. Therefore, the torque of the rotation body 7 rotating along with the output shaft is transmitted through the rotation shaft 1 to the rotation body 6. After the torque is transmitted to the rotation body 6 in this manner, the torque is transferred also to the drive wheel 17 to produce rotation of the drive wheel 17. At this point, if the knuckle arm 12 moves rotationally in either of the directions of the arrows 18, the drive wheel 17 is changed in direction.

Figure 7:
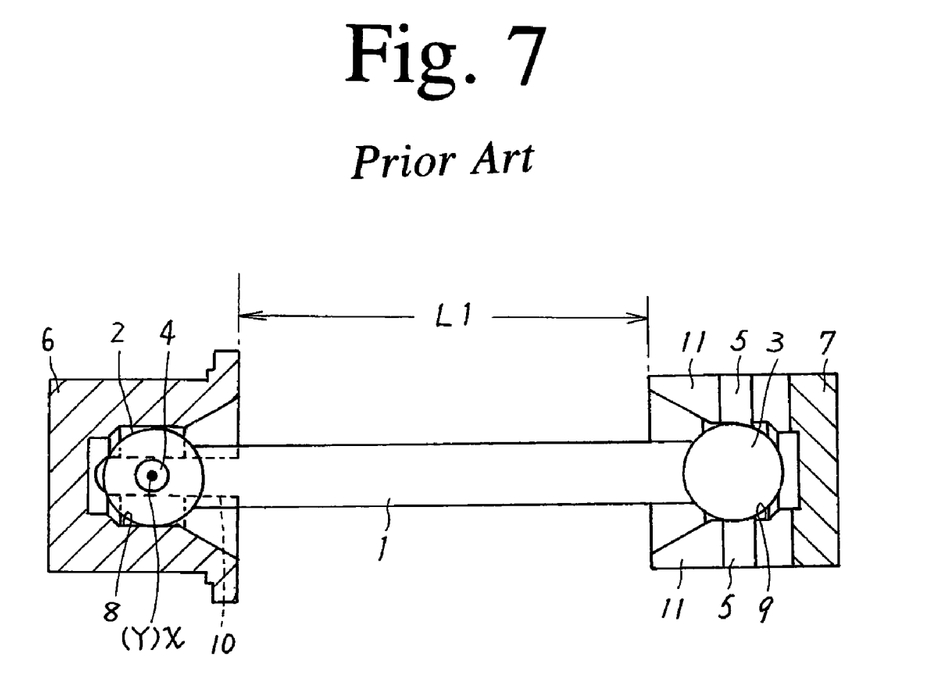
FIG. 7 is a sectional view illustrating a pair of rotation bodies located on the same axis in the conventional universal joint.

When the knuckle arm 12 moves rotationally in either of the directions of the arrows 18 about the X point where the kingpin is provided as described above, a virtual distance between the opposing rotation bodies 6 and 7 increases. For example, when the rotation bodies 6 and 7 are on the same axis, the distance between the rotation bodies 6 and 7 is L1 as illustrated in FIG. 7. When the rotation bodies 6 and 7 are placed on the same axis as described above, the rotation center X of the rotation body 6 and the rotation center Y of the ball portion 2 are considered to align with each other.

Figure 8:
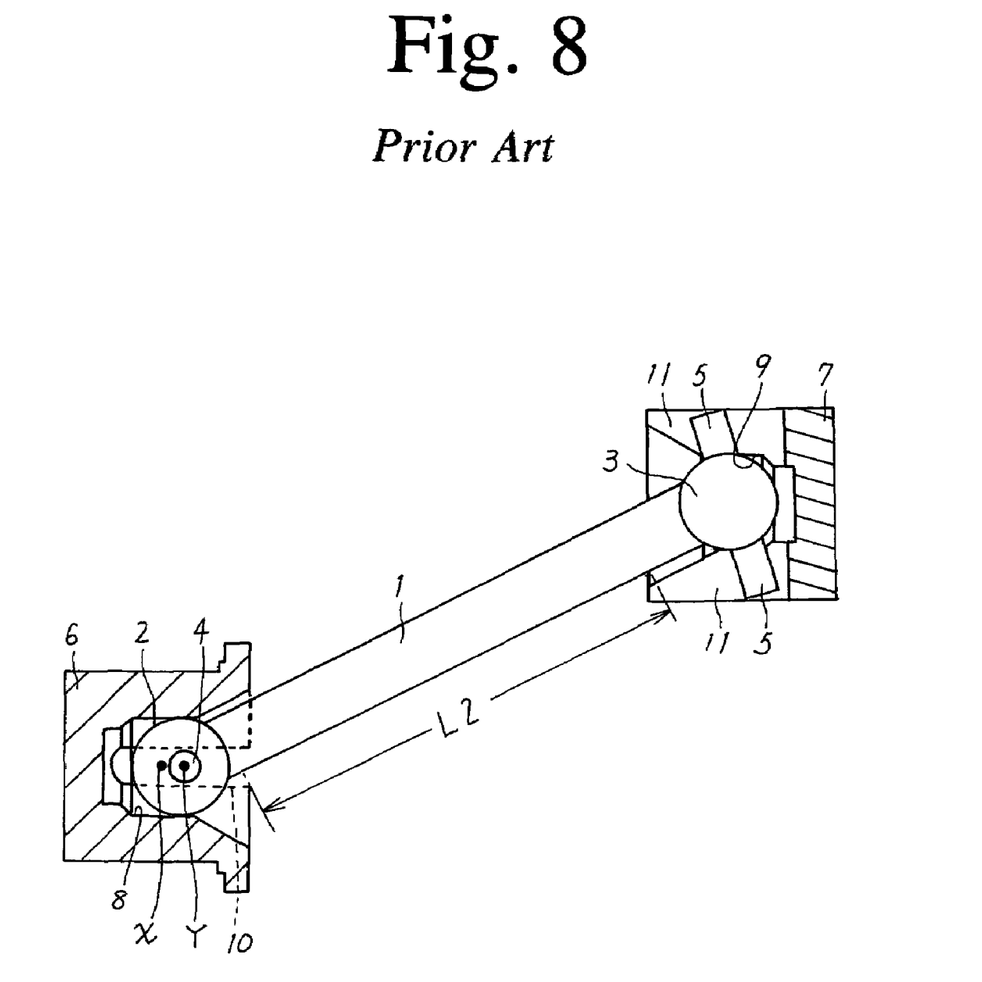
FIG. 8 is a sectional view illustrating the pair of rotation bodies of which one rotation body rotates in the conventional universal joint.

If the rotation body 6 rotates from the above position about the rotation center X, the distance between the rotation bodies 6 and 7 becomes L2 as shown in FIG. 8. The distance L2 becomes longer than the distance L1. However, even if the opposite distance between them increases from L1 to L2 as described above, the rotation shaft 1 is not extendable, and therefore a difference between the two distances is absorbed by moving the ball portions 2 and 3 in the holding holes 8 and 9 of the rotation bodies 6 and 7 in the axial direction.

A specific examination is not made for the conventional example.

Regarding conventional universal joints structured as described above, for example, when the rotation body 6 rotates about the position X, the distance between the rotation bodies 6 and 7 is increased by a length "L2−L1". For example, it is assumed that the increased length is absorbed in the rotation body 6 of the two rotation bodies. If the increased distance is absorbed in the rotation body 6 in this manner, the rotation center Y of the ball portion 2 becomes out of alignment with the rotation center X of the rotation body 6 as shown in FIG. 8.

The misalignment caused between the rotation center X of the rotation body 6 and the rotation center Y of the ball portion 2 as described above makes it impossible for the rotation body 6 to rotate about the center X. Still, the knuckle arm 12 continues to rotate about the center X in order to change the direction the drive wheel 17 travels. However, at this point, the rotation body 6 rotates while pulling the rotation center Y of the ball portion 2 to the rotation center X. In other words, the rotation body 6 rotates while moving the rotation shaft 1 toward the rotation body 6 in such a manner as to draw the ball portion 3 located at the other end of the rotation shaft 1 out from the holding hole 9 of the rotation body 7.

If the rotation body 6 rotates while pulling the ball portion 2 inward as described above, the resistance is increased, thereby making it difficult to smoothly change the direction the drive wheel 17 travels. Further, every time the direction the drive wheel 17 travels is changed as described above, the rotation shaft 1 moves in the axial direction. Thus, a smooth change in the direction the drive wheel 17 travels is made difficult.

Note that the foregoing description is given of an example of integrating the drive mechanism of the drive wheel 17 and the steering mechanism with each other and systematically rotating the rotation body 6 of the two rotation bodies about the center X. However, in the aforementioned conventional universal joints, the rotation of the rotation body is not caused systematically, but is caused as a consequence. In this case, problems as described in the forgoing also arise.

Any problem as described in the forgoing does not arise if the rotation center Y of the ball portion 2 in the holding hole 8 and the rotation center X of the rotation body 6 are in alignment with each other at all times. However, in view of the cost merits, the conventional universal joint as described above is not designed such that the rotation center Y of the ball portion 2 in the holding hole 8 and the rotation center X of the rotation body 6 are systematically aligned with each other. In order to achieve the positional alignment between the rotational center Y of the ball portion 2 in the holding hole 8 and the rotation center X of the rotation body 6, this type of inexpensive universal joint is considered incompetent, and the use of a higher precision universal joint is considered necessary.

Further, the holding hole 8 needs to be deepened for ensuring the amount of movement of the center Y of the ball portion 2. However, when the ball portion 2 is positioned close to the closed end of the holding hole 8, if the rotation shaft 1 moves toward the rotation body 6, disadvantageously, the rotation shaft 1 is pressed against the opening edge of the holding hole 8 and causes damage to the opening edge.

SUMMARY OF THE INVENTION

An object of the present invention is to provide a universal joint that is of an inexpensive form of inserting a ball portion into a holding hole but is capable of maintaining a ball portion in position in a holding hole.

The present invention is based on a universal joint that is provided with a rotation shaft having a ball portion provided at an end of the rotation shaft and a pair of projections formed on a diameter line of the ball portion, and a rotation body having guide grooves formed for receiving insertion of the respective projections of the rotation shaft and a holding hole formed for holding the ball portion, the ball portion being rotatable about an axis line of the projections and rotatable while inclining the projections along the guide grooves.

Based on the universal joint, a first characteristic of the present invention is that a stopper is provided in the holding hole for inhibiting the ball portion from slipping off, and misalignment of a rotation center when the ball portion rotates about the axis line of the projections is prevented.

A second characteristic of the present invention is that a pin is inserted into the rotation body, is placed on at least one side of the rotation shaft placed in the rotation body, and serves as the stopper.

A third characteristic of the present invention is that a ball is embedded in a face of the holding hole of the rotation body, and is in contact with the ball portion placed in the holding hole, and serves as the stopper.

According to these characteristics, because the stopper is provided for specifying the position of the ball portion in the holding hole, it is possible to align the rotation center of the ball portion and the rotation center of either the rotation body or a bearing or the like fitted to the rotation body with each other at all times. Because the rotation centers of the ball portion and the rotation body or the like are able to be always aligned with each other in this manner, it is possible to rotate the rotation body extremely smoothly. Hence, when the universal joint according to the present invention is used as, for example, a drive shaft of a drive wheel with a steering mechanism in a radio-controlled car, it becomes possible to align the rotation center of the ball portion with the position of the kingpin provided on the knuckle arm at all times, leading to an extreme smooth change in the direction the drive wheel travels.

A distinctive feature of this type of universal joint is inexpensiveness. Without loss of this "inexpensiveness", the present invention is able to positively resolve the conventional problems. That is, an adequate improvement in performance is achieved only by placing a ball portion in a rotation body in a conventional universal joint and using a stopper to trap the ball portion. The cost merit caused by this is immeasurable.

A fourth characteristic of the present invention is that an opening end of the holding hole is placed close to the stopper.

According to the fourth characteristic, because the ball portion is subject to a positional limit within the holding hole of the rotation body, the holding hole does not need to be deepened. In consequence, even when the rotation shaft moves toward the rotation body, the rotation shaft has less tendency to come into contact with the opening end of the holding hole. Thus, the opening end of the holding hole is not damaged by the rotation shaft.

DETAILED DESCRIPTION OF THE PREFERRED EMBODIMENT

Figure 1:
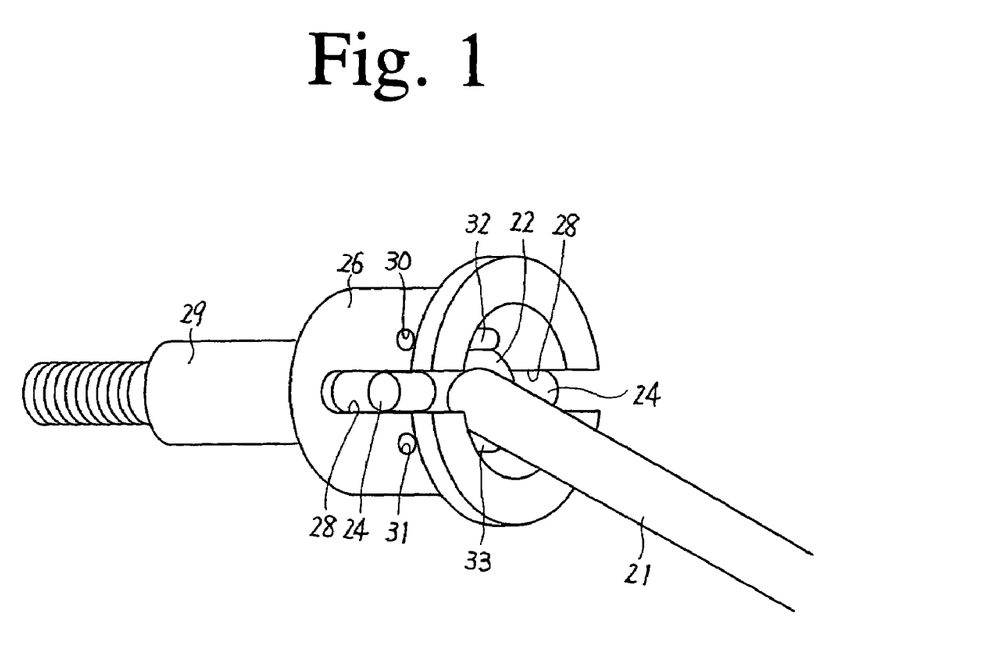
FIG. 1 is a perspective view illustrating an essential part of the present invention.
Figure 2:
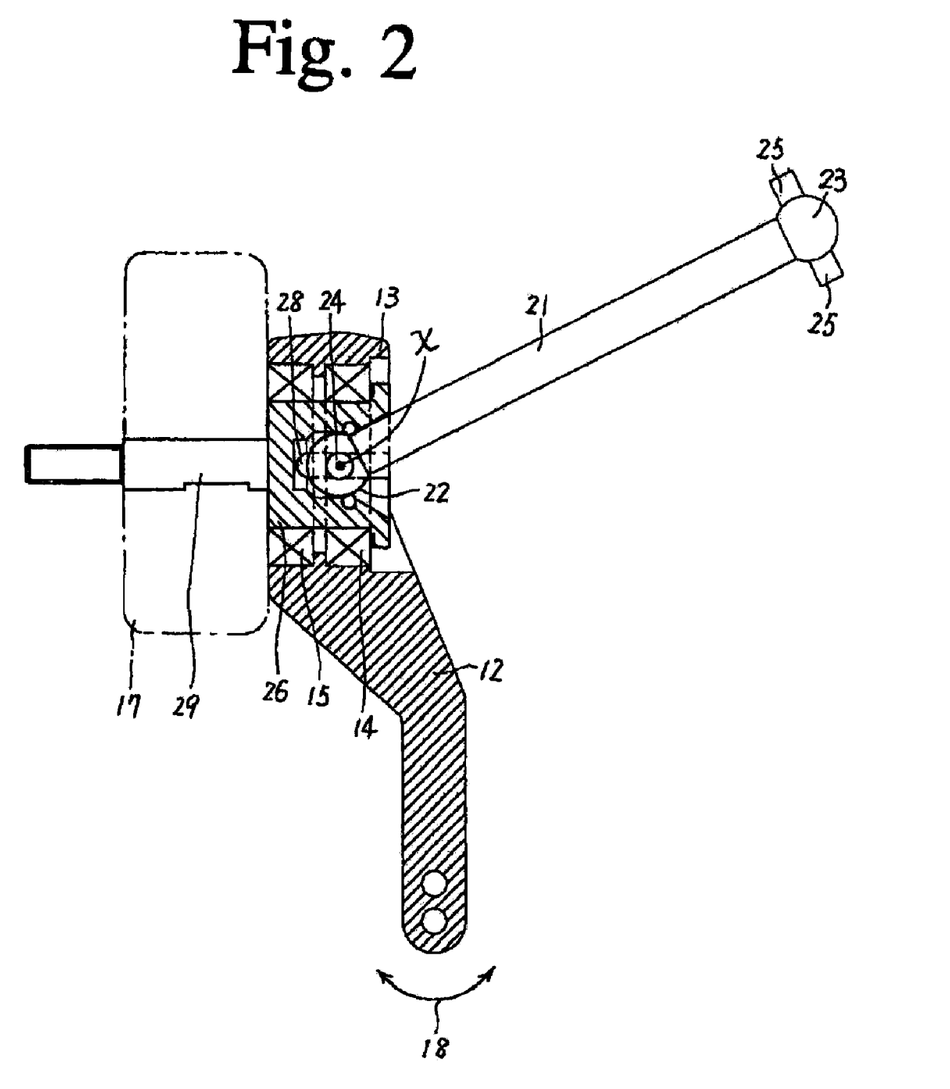
FIG. 2 is a partially sectional view of the present invention associated with a drive wheel provided in a steering mechanism of a radio-controlled car.
Figure 3:
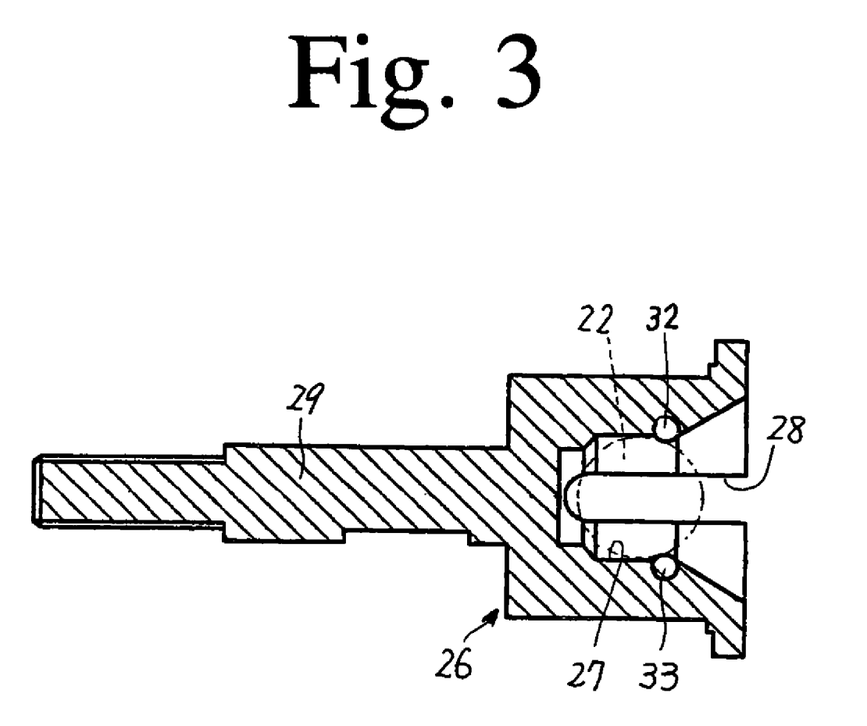
FIG. 3 is a sectional view of a rotation body.

FIGS. 1 to 3 illustrate an embodiment of using the universal joint of the present invention for a radio-controlled car. The universal joint has ball portions 22 and 23 respectively provided at the ends of a rotation shaft 21. The ball portions 22 and 23 have respective pairs of projections 24 and 25 placed on their diameter lines.

Further, the two ends of the rotation shaft 21 are respectively coupled to two rotation bodies. One rotation body 26 of the two rotation bodies has features as the present invention, and the other rotation body is the same as that conventionally used. Therefore, a detailed description of the other rotation body is omitted and, when required, a description will be given by using the same reference numbers as those in the description of the conventional example.

The rotation body 26 is formed in a tubular shape and has a holding hole 27 drilled on the axis line of the rotation body 26. The ball portion 22 is placed in the holding hole 27. The rotation body 26 structured in this manner has two guide grooves 28 formed in positions 180 degrees out of phase with each other and extending in the axis direction of the rotation body 26. The guide grooves 28 receive respective projections 24 of the ball portion 22 which is placed in the holding hole 27, and allow the projections 24 to move therein.

By placing the ball portion 22 in the holding hole 27 in this manner, the ball portion 22 can rotate about the axis of the projections 24, and further rotate while tilting the projections 24 in the guide grooves 28. Thus, the rotation shaft 21 is capable of rotating in any direction with respect to the rotation body 26.

For example, the universal joint structured as described above is used in a radio-controlled car together with a steering mechanism to provide the coupling between a drive wheel and an output shaft or the like. This use is the same as that described in the conventional example, and the structural components of the steering mechanism and the drive mechanism are described by use of the same reference numerals as those in the conventional example.

The rotation body 26 is connected to a drive wheel 17 as illustrated in FIG. 2. The rotation body 26 is fitted, via bearings 14 and 15, in a ring portion formed in a steering-system knuckle arm 12 of the drive wheel 17. Then, the drive wheel 17 is fixed to an axle 29 provided integrally with the rotation body 26. Accordingly, upon the rotation of the rotation shaft 21, the rotation body 26 rotates, and in turn the drive wheel 17 rotates with the rotation of the rotation body 26. Then, the knuckle arm 12 moves rotationally in directions of the arrows 18 shown in FIG. 8, and the center of the rotational motion is a point X corresponding to the center of a kingpin (not shown).

The other rotation body 7, which is located opposite to the rotation body 26, is connected to an output shaft (not shown) as in the case of the conventional example and rotates in conjunction with the output shaft. Therefore, the rotation body 7 rotates along with the output shaft and the torque of the rotation body 7 is transmitted through the rotation shaft 21 to the rotation body 26. After the torque is transmitted to the rotation body 26 in this manner, the torque is transferred also to the drive wheel 17 to produce rotation of the drive wheel 17. At this point, if the knuckle arm 12 moves rotationally in either of the directions of the arrows 18, the drive wheel 17 is changed in direction.

The rotation body 26 structured as described above has a pair of through holes 30 and 31 formed therein so as to cross the holding hole 27 as is clear from FIGS. 1 to 3. A pair of pins 32 and 33 corresponding to a stopper of the present invention is inserted into the respective through holes 30 and 31. The pins 32 and 33 thus inserted in the through holes 30 and 31 are in contact with the ball portion 22 in the holding hole 27 to perform the function of preventing the ball portion 22 from slipping off. Hence, the ball portion 22 is subject to a positional limit by the pins 32 and 33. The rotation center X of the knuckle arm 12 and the rotation center Y of the ball portion 22 are designed to align with each other in the limited position.

Accordingly, even if the knuckle arm 12 rotates about the kingpin, the center of relative rotation between the ball portion 22 and the rotation body 26 is not displaced. Because there is no displacement of the relative rotation center, the knuckle arm 12 smoothly rotates about the kingpin. In other words, all inconveniences caused by a misalignment between the rotation body 26 and the ball portion 22 as occurring in the conventional example is eliminated. In the embodiment, one rotation body 26 of the two rotation bodies has the pins 32 and 33 provided for trapping the ball portion 22 in the rotation body 26, but the other rotation body 7 is structured as in the case of the conventional example. Hence, when the knuckle arm 12 rotates and the distance between the rotation bodies 26 and 7 is changed from L1 to L2 as described earlier, this change is completely absorbed by the other rotation body 7.

Further, according to the embodiment, there's no need to secure the amount of movement of the center Y of the ball portion 2 as is done conventionally. In turn, this eliminates the need for increasing the depth of the holding hole 27. In consequence, the opening end of the holding hole 27 and the pins 32 and 33 can be positioned close to each other. This makes it possible for an allowable angle of relative rotational movement between the rotation shaft 21 and the rotation body 26 to be set large. If the allowable angle of bending can be increased in this manner, even when the rotation shaft 21 and the rotation body 26 greatly move rotationally relative to each other, the rotation shaft 21 will not cause any damage to the opening end of the holding hole 27.

Further, the universal joint of the present invention is successfully achieved simply by placing the ball portion 22 in the holding hole 27 of the rotation body 26 and mounting the pins 32 and 33 corresponding to the stopper for preventing the ball portion 22 from slipping off. As a result, it is possible to reliably eliminate the problems associated with conventional universal joints as illustrated in FIG. 4 to FIG. 7 while taking full advantage of inexpensiveness of the conventional universal joints. In the embodiment, a pair of pins 32 and 33 is used. However, the ball portion 22 may be trapped by only one pin. Whether one pin or two pins is used depends on costs, required accuracy of dimension, or the like.

In the embodiment, the pins 32 and 33 are used as the stopper. However, for example, a ball may be embedded in the inner face of the holding hole 27 in such a manner as to be in contact with the ball portion in the holding hole 27. In this case, the ball constitutes the stopper of the present invention. In either case, in the present invention, the structure of the stopper is not specifically limited as long as the stopper is capable of being in contact with the ball portion 22 in the holding hole 27 so as to prevent the ball portion 22 from slipping off.

What is claimed is:

1. A universal joint comprising:
   a rotation shaft having a ball portion provided at an end of the rotation shaft and a pair of projections formed on a diameter line of the ball portion, and
   a rotation body having guide grooves formed for receiving insertion of the respective projections of the rotation shaft and a holding hole formed for holding the ball portion, the ball portion being rotatable about an axis line of the projections and rotatable while inclining the projections along the guide grooves,
   wherein the rotation body has a pair of through holes formed therein to cross the holding hole, and a pair of pins are respectively inserted into the pair of through-holes and are respectively placed on two sides of the rotation shaft connected to the ball portion mounted in the holding hole, so that the pair of pins prevent misalignment of a rotation center when the ball portion rotates about the axis line of the projections.

2. The universal joint according to claim 1, wherein an opening end of the holding hole is positioned close to the pair of pins.

* * * * *